(12) United States Patent
Seo

(10) Patent No.: US 9,135,688 B2
(45) Date of Patent: Sep. 15, 2015

(54) METHOD FOR BRIGHTNESS EQUALIZATION OF VARIOUS IMAGES

(71) Applicant: Hyundai Mobis Co., Ltd., Seoul (KR)

(72) Inventor: Ji Won Seo, Yongin-si (KR)

(73) Assignee: Hyundai Mobis Co., Ltd., Seoul (KR)

(*) Notice: Subject to any disclaimer, the term of this patent is extended or adjusted under 35 U.S.C. 154(b) by 0 days.

(21) Appl. No.: 14/256,081

(22) Filed: Apr. 18, 2014

(65) Prior Publication Data

US 2014/0341467 A1   Nov. 20, 2014

(30) Foreign Application Priority Data

May 14, 2013  (KR) .................. 10-2013-0054091

(51) Int. Cl.
*G06K 9/00*  (2006.01)
*G06T 5/00*  (2006.01)
*G06T 5/40*  (2006.01)
*G06T 5/50*  (2006.01)

(52) U.S. Cl.
CPC . *G06T 5/008* (2013.01); *G06T 5/40* (2013.01); *G06T 5/50* (2013.01); *G06T 2207/30264* (2013.01)

(58) Field of Classification Search
CPC ............. G06T 5/008; G06T 5/50; G06T 5/40; G06T 2207/30264; G06T 7/408; H04N 1/4051; H04N 1/4052; H04N 1/4053; H04N 1/4055; H04N 1/4057; H04N 1/52
See application file for complete search history.

(56) References Cited

U.S. PATENT DOCUMENTS

2011/0123086 A1*  5/2011  Nie et al. ................... 382/132
2014/0119651 A1*  5/2014  Meyers et al. ............ 382/167

* cited by examiner

*Primary Examiner* — Brian Le
(74) *Attorney, Agent, or Firm* — NSIP Law

(57) ABSTRACT

The present invention provides a method for brightness equalization of a plurality of images to equalize brightness when composing, into a single image, a plurality of images acquired from a plurality of cameras.

16 Claims, 7 Drawing Sheets

METHOD FOR BRIGHTNESS EQUALIZATION OF VARIOUS IMAGES

CROSS-REFERENCE TO RELATED APPLICATION

This application claims priority to and the benefit of Korean Patent Application No. 10-2013-0054091 filed in the Korean Intellectual Property Office on May 14, 2013, the entire contents of which are incorporated herein by reference.

TECHNICAL FIELD

The present invention relates to a method for brightness equalization of a plurality of images, and more particularly, to a method for brightness equalization of a plurality of images to equalize brightness when composing, into a single image, a plurality of images acquired from a plurality of cameras.

BACKGROUND OF THE INVENTION

To prevent a risk of an accident and provide convenience in parking, many users are equipping a vehicle with a black box or a function of a rear view camera.

Accordingly, recently, developed is an around view monitor (AVM) system configured to mount cameras on left and right sides as well as front and rear of a vehicle and thereby output a view on a display as if a total of four cameras are looking down from above the vehicle.

The AVM system is designed to compose images acquired from cameras mounted all around the vehicle, thereby enabling a user to conveniently observe the surroundings through a monitor disposed inside of the vehicle.

However, in the AVM system according to the related art, brightness of images acquired from the respective cameras mounted on the vehicle differs from each other and thus, a composite image of the images is unnatural. Accordingly, the user may not have the natural perception for the composite image.

Also, a method of composing and thereby displaying images of an in-vehicle camera according to the related art, calculates image brightness using an average value of the entire pixels belonging to an image. Accordingly, due to another object or shadow, an error occurs when averaging a value of brightness or gain and thus, an accurate brightness correction is difficult to achieve.

SUMMARY OF THE INVENTION

The present invention has been made in an effort to provide a method for brightness equalization of a plurality of images that naturally corrects brightness using a brightness histogram when composing, into a single image, images acquired from a plurality of cameras.

Also, the present invention has been made in an effort to provide a method for brightness equalization of a plurality of images that provides an environment in which a user may further focus on driving without being aware of the difference.

An exemplary embodiment of the present invention provides a method for brightness equalization of a plurality of images, the method including: receiving at least two input images; composing the at least two input images into a single composite image; setting a correction area corresponding to each input image in the composite image, and calculating a brightness histogram of each correction area; calculating a representative value of at least one modal in the brightness histogram, and grouping a modal of each correction area based on the representative value; calculating a correction target value of each group based on a representative value of modals grouped into each group; calculating a corrected value by subtracting the representative value of modals of each group of each correction area from the correction target value of each group; and correcting brightness by adding the corrected value to a pixel value of each group of each correction area.

In the calculating of the brightness histogram, the brightness histogram may be calculated in the entire area corresponding to each input image in the composite image or calculated in an area in which the input images are adjacent to each other in the composite image.

Also, a quantization level may be lowered to simplify a shape of the brightness histogram.

In the calculating of the representative value of each modal and the grouping of the modal of each correction area, the representative value of each modal may be calculated as any one of an average brightness value and a maximum value of pixels of each modal.

In the calculating of the correction target value, the correction target value may be calculated as any one of an average value of representative values of modals grouped into each group, a representative value of a modal having a widest area, and a representative value of a modal having a highest peak value.

Another exemplary embodiment of the present invention provides a method for brightness equalization of a plurality of images, the method including: receiving at least two input images; setting a correction area in each input image, and calculating a brightness histogram of each correction area; calculating a representative value of at least one modal in the brightness histogram, and grouping a modal of each correction area based on the representative value; calculating a correction target value of each group based on a representative value of modals grouped into each group; calculating a corrected value by subtracting the representative value of modals of each group of each correction area from the correction target value of each group; correcting brightness by adding the corrected value to a pixel value of each group of each correction area, and creating at least two corrected images; and composing the at least two corrected images into a single composite image.

In the calculating of the brightness histogram, the brightness histogram may be calculated in the entire area of each input image or calculated in an area to be used for composition in each input image.

Also, a quantization level may be lowered to simplify a shape of the brightness histogram.

In the calculating of the representative value of each modal and the grouping of the modal of each correction area, the representative value of each modal may be calculated as any one of an average brightness value and a maximum value of pixels of each modal.

In the calculating of the correction target value, the correction target value may be calculated as any one of an average value of representative values of modals grouped into each group, a representative value of a modal having a widest area, and a representative value of a modal having a highest peak value.

According to a method for brightness equalization of a plurality of images of the present invention, brightness is naturally corrected using a brightness histogram and thus, a user may further focus on driving without being aware of the difference. Accordingly, it is possible to prevent a risk of an accident and provide convenience in parking.

DETAILED DESCRIPTION OF THE EMBODIMENTS

Hereinafter, a method for brightness equalization of a plurality of images according to exemplary embodiments of the present invention will be described in detail with reference to the accompanying drawings.

Figure 1:
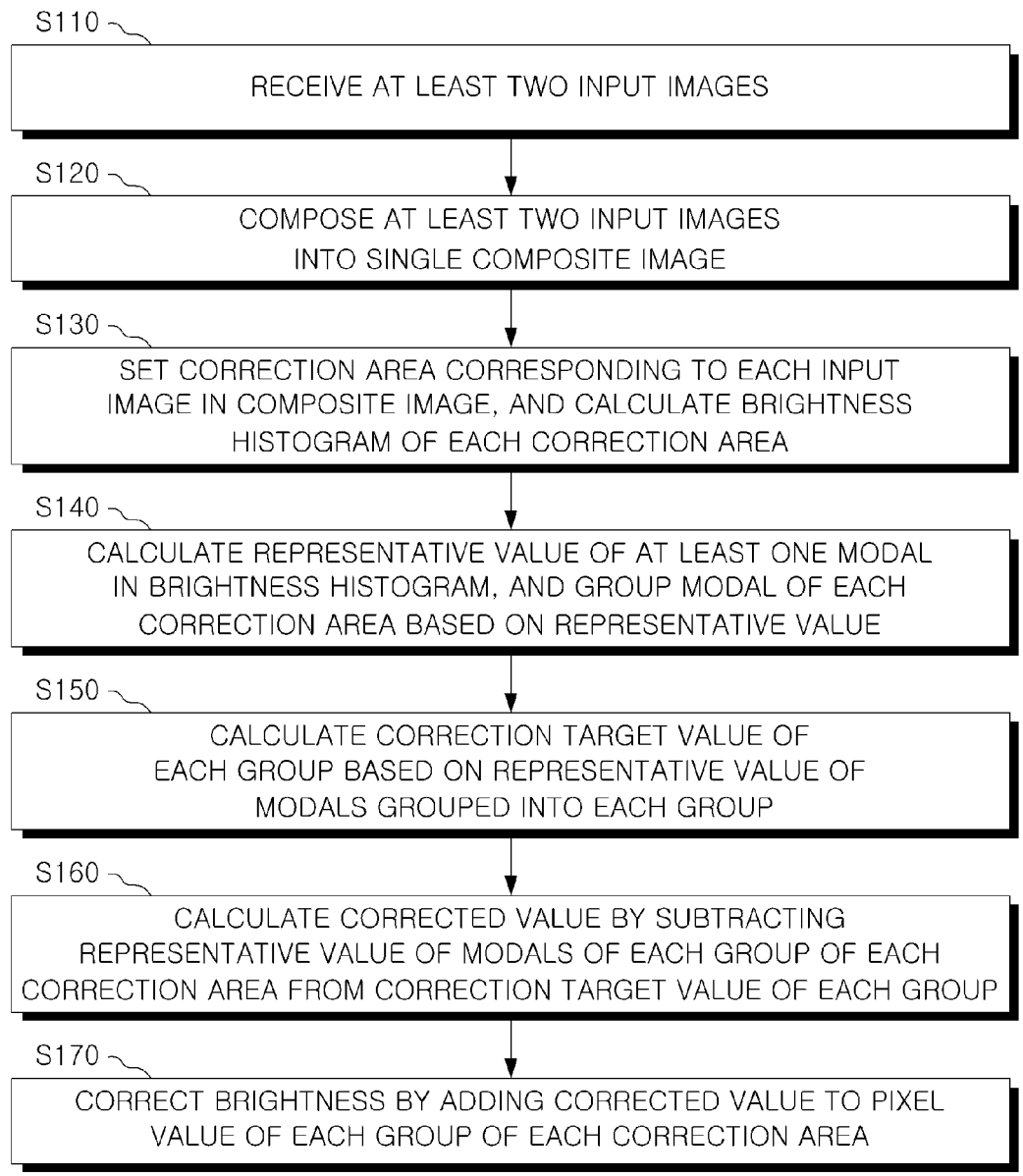
FIG. 1 is a flowchart illustrating a method for brightness equalization of a plurality of images according to a first exemplary embodiment of the present invention.

As illustrated in FIG. 1, a method for brightness equalization of a plurality of images according to the present first exemplary embodiment may include receiving at least two input images (S110); composing the at least two input images into a single composite image (S120); setting a correction area corresponding to each input image in the composite image, and calculating a brightness histogram of each correction area (S130); calculating a representative value of at least one modal in the brightness histogram, and grouping a modal of each correction area based on the representative value (S140); calculating a correction target value of each group based on a representative value of modals grouped into each group (S150); calculating a corrected value by subtracting the representative value of modals of each group of each correction area from the correction target value of each group (S160); and correcting brightness by adding the corrected value to a pixel value of each group of each correction area (S170).

Initially, in operation S110 of receiving at least two images, a plurality of images may be input by photographing a surrounding area adjacent to a vehicle through cameras mounted to front, rear, left, and right of the vehicle.

Here, a camera is not limited to being mounted to the vehicle and may be used for a system for composing a plurality of images. Accordingly, the method for brightness equalization may be applied regardless of a position or a place at which the camera is mounted.

Next, in operation S120 of composing at least two input images into a single composite image, the plurality of input images may be composed into a single composite image.

A wide angle camera is used to photograph the surroundings of the vehicle to represent all around view of the vehicle on a single screen. Since a distortion phenomenon that an edge portion of an image is distorted due to a distortion of a camera lens having a short focal distance occurs, a correction and flatness is basically performed on the distortion after the plurality of images is composed into the single composite image.

Next, in operation S130 of setting a correction area corresponding to each input image in the composite image, and calculating a brightness histogram of each correction area, the brightness histogram is calculated in the entire area corresponding to each input image in the composite image or calculated in an area in which the input images are adjacent to each other in the composite image. A quantization level is lowered to simplify a shape of the brightness histogram.

Figure 3A:
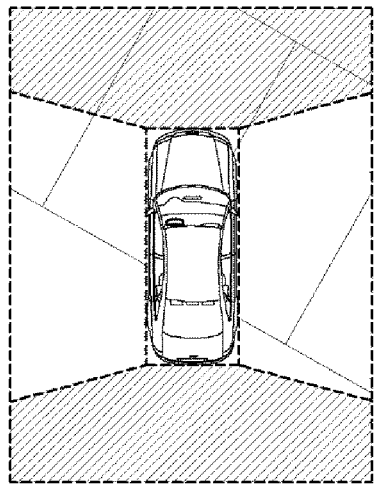
FIGS. 3A and 3B are images describing a method of setting an area used to calculate a brightness histogram according to the first exemplary embodiment of the present invention.
Figure 3B:
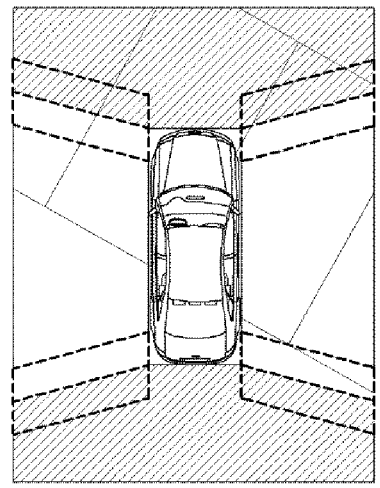

As illustrated in FIGS. 3A and 3B, a method of setting an area used to calculate a brightness histogram in each image uses two calculation methods.

Figure 5:
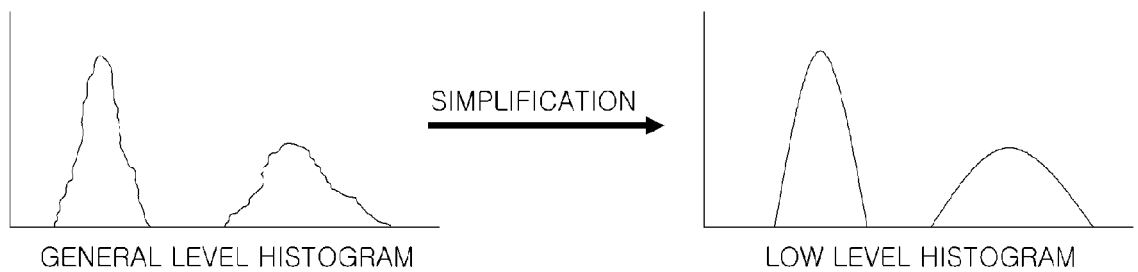
FIG. 5 is graphs showing a change in a shape of a histogram based on a quantization level.

After calculating the brightness histogram using one of the two calculation methods, a shape of a histogram is simplified by lowering the quantization level to be less than 256 level (8 bits) that is a general brightness level, as illustrated in FIG. 5.

Quantization is to perform division into a finite number of levels at which a change amount of continuous analogs discretely varies within the range of a constant width, and to assign a unique value to each level.

Accordingly, when the quantization level is lowered, the shape of the histogram is simplified.

Next, in operation S140 of calculating a representative value of at least one modal in the brightness histogram, and grouping a modal of each correction area based on the representative value, the representative value of each modal may be calculated as any one of an average brightness value and a maximum value of pixels of each modal.

Figure 6:
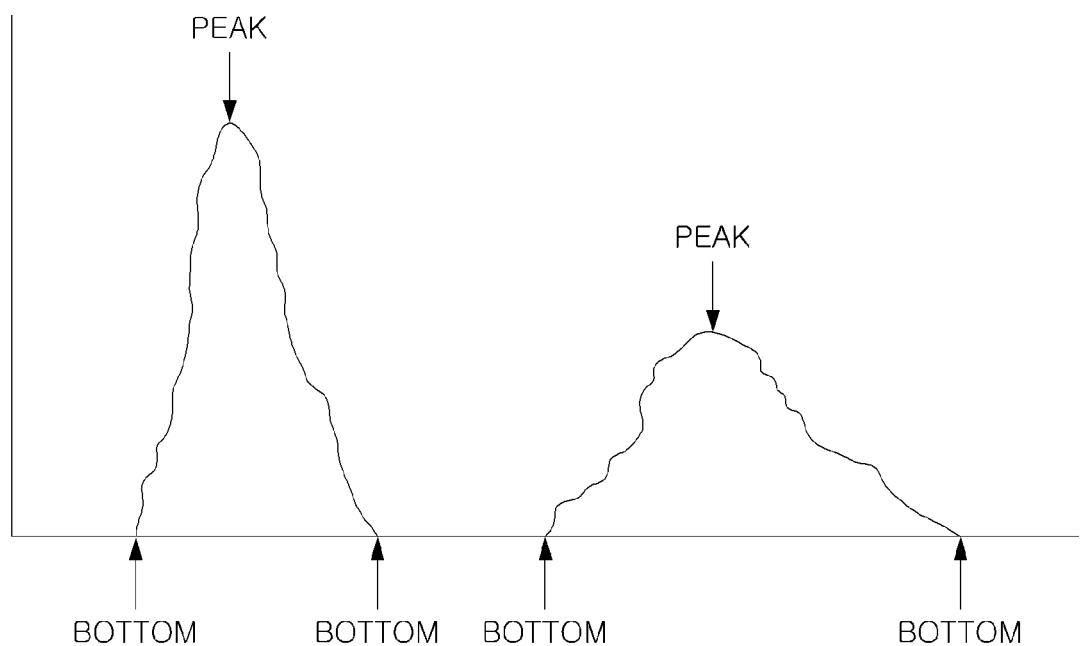
FIG. 6 is a graph showing modals.

Here, the modal refers to a parabolic shape including at least one peak between two bottoms, as illustrated in FIG. 6.

Accordingly, it can be said that two modals are present in the graph of FIG. 6.

The representative value of each modal may be calculated as the average brightness value of pixels belonging to each modal by referring to the shape of the histogram in which the quantization is lowered in the brightness histogram calculating operation.

The average brightness value of pixels is calculated by multiplying each x-axial value of each modal by a y-axial value corresponding to each x-axial value, adding up the multiplication result, and dividing the addition result by all the y-axial values corresponding to x-axial values.

Also, the representative value of each modal may be calculated as a peak value of each modal.

Figure 7:
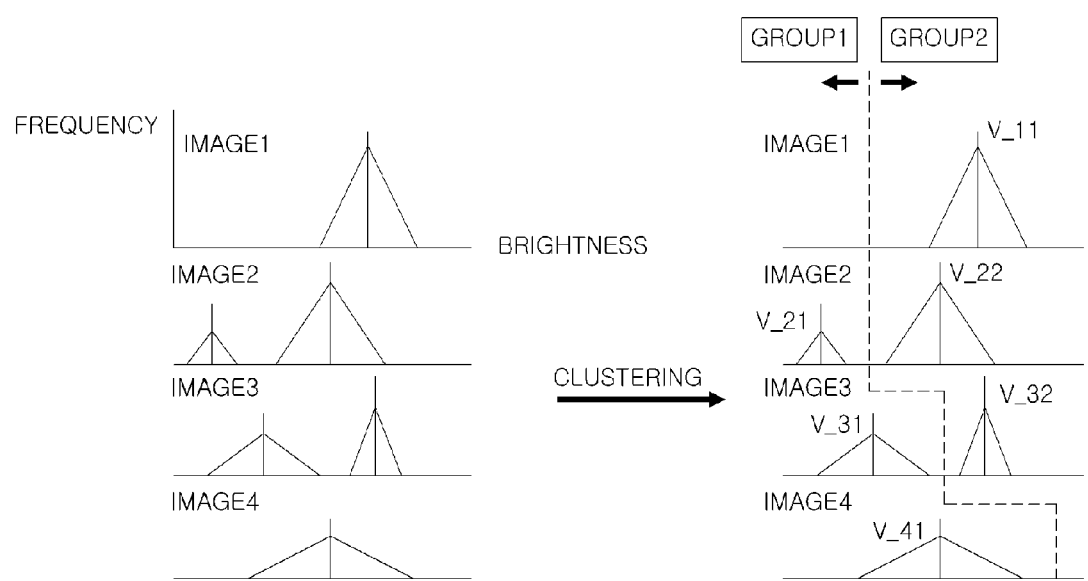
FIG. 7 is graphs showing modals classified into a group.

As illustrated in FIG. 7, a clustering method is used as a method for grouping a modal.

The clustering method may be a kind of classification work of including, in the same cluster, objects present in the same distance on a vector space and including, in different clusters, objects not present in the same distance, based on statistical similarity between objects that constitute a data set called a cluster analysis.

In graphs after being grouped into group 1 and group 2 by the clustering method, $V\_11$, $V\_21$, and the like, are used to help the easy understanding in the brightness corrected value calculating operation, and indicate representative values of the respective modals.

Next, in operation S150 of calculating a correction target value of each group based on a representative value of modals grouped into each group, the correction target value may be calculated as any one of an average value of representative values of modals grouped into each group, a representative value of a modal having a widest area, and a representative value of a modal having a highest peak value.

In a method of using the average value of representative values of modals grouped into each group, a correction target value of group 1 may be calculated as $(V\_21+V\_31+V\_41)/3$, and a correction target value of group 2 may be calculated as $(V\_11+V\_22+V\_32)/3$.

An area when calculating the representative value of the modal having the widest area is calculated by adding up all the y-axial values corresponding to x-axial values of the modal.

Next, in operation S160 of calculating a corrected value by subtracting the representative value of modals of each group of each correction area from the correction target value of each group, the corrected value corresponding to each modal is calculated as a value obtained by subtracting the representative value of each modal from a correction target value of a group to which each modal belongs.

Next, in operation S170 of correcting brightness by adding the corrected value to a pixel value of each group of each correction area, the brightness may be corrected by adding each corresponding corrected value to the pixel value of each group.

Each corresponding corrected value may be calculated based on a pixel value of each input image by multiplying the calculated corrected value of each modal by a weight of the pixel value of each input image.

The pixel value indicates a brightness value of a pixel using a number between "0" (black) and "255" (white).

Finally, when adding each corresponding corrected value to a pre-correction pixel value based on a pixel value of each input image, a post-correction pixel value may be obtained.

Hereinafter, a method for brightness equalization of a plurality of images according to a second exemplary embodiment of the present invention will be described in detail with reference to the accompanying drawings.

Figure 2:
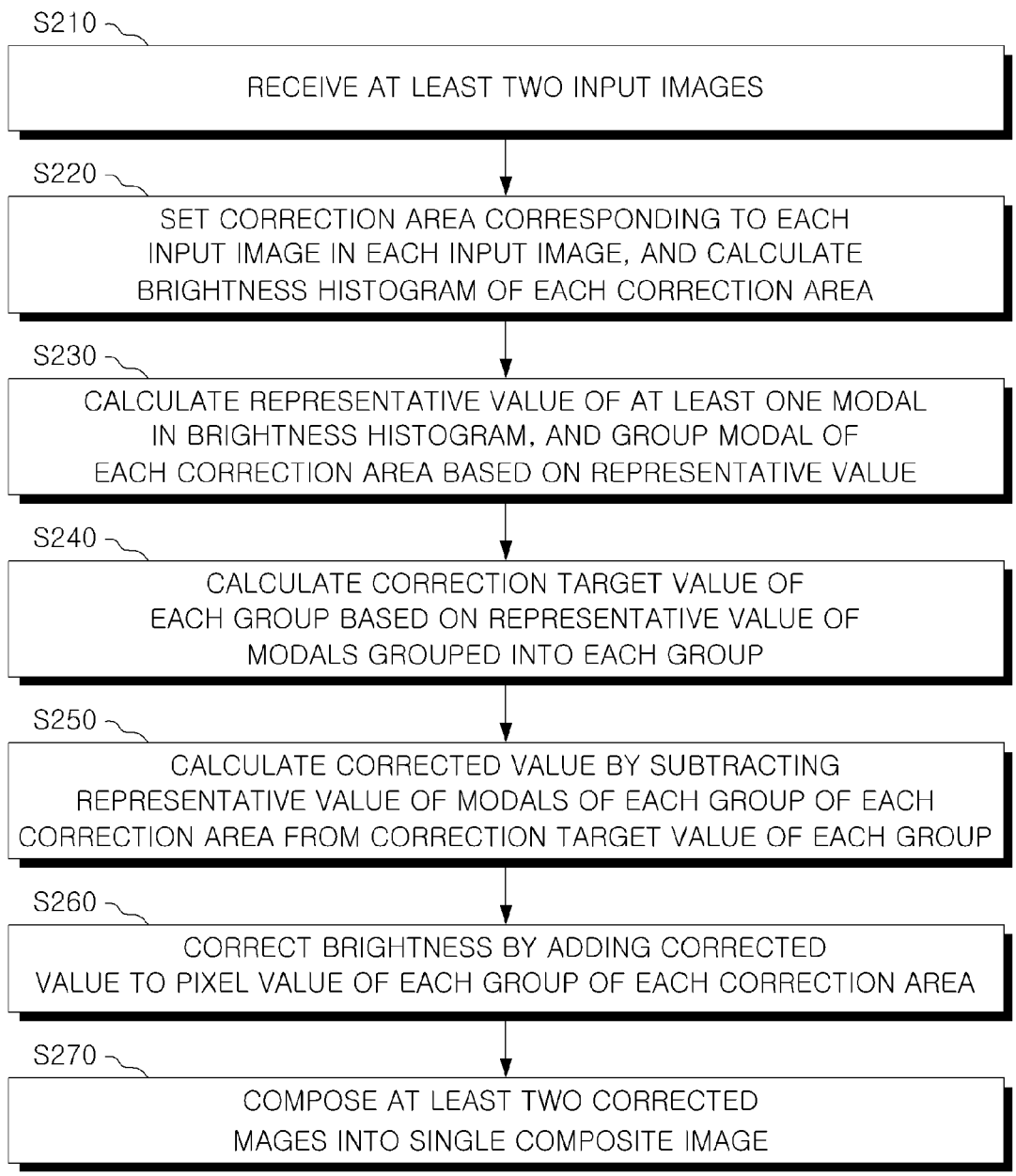
FIG. 2 is a flowchart illustrating a method for brightness equalization of a plurality of images according to a second exemplary embodiment of the present invention.

As illustrated in FIG. 2, the method for brightness equalization of a plurality of images according to the second exemplary embodiment of the present invention may include receiving at least two input images (S210); setting a correction area in each input image, and calculating a brightness histogram of each correction area (S220); calculating a representative value of at least one modal in the brightness histogram, and grouping a modal of each correction area based on the representative value (S230); calculating a correction target value of each group based on a representative value of modals grouped into each group (S240); calculating a corrected value by subtracting the representative value of modals of each group of each correction area from the correction target value of each group (S250); correcting brightness by adding the corrected value to a pixel value of each group of each correction area, and creating at least two corrected images (S260); and composing the at least two corrected images into a single composite image (S270).

Initially, in operation S210 of receiving at least two images, a plurality of images may be input by photographing a surrounding area adjacent to a vehicle through cameras mounted to front, rear, left, and right of the vehicle.

Here, a camera is not limited to being mounted to the vehicle and may be used for a system for composing a plurality of images. Accordingly, the method for brightness equalization may be applied regardless of a position or a place at which the camera is mounted.

Next, in operation S220 of setting a correction area in each input image, and calculating a brightness histogram of each correction area, the brightness histogram is calculated in the entire area of each input image or calculated in an area to be used for composition in each input image. A quantization level is lowered to simplify a shape of the brightness histogram.

Figure 4A:
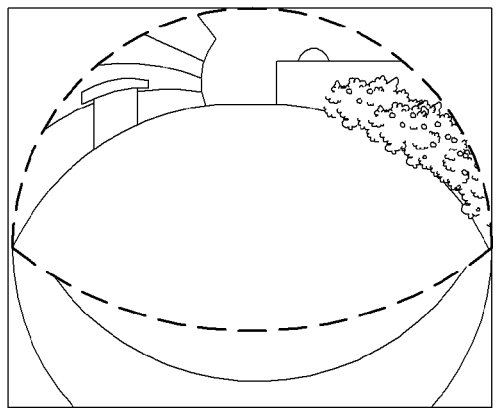
FIGS. 4A and 4B are images describing a method of setting an area used to calculate a brightness histogram according to the second exemplary embodiment of the present invention.
Figure 4B:
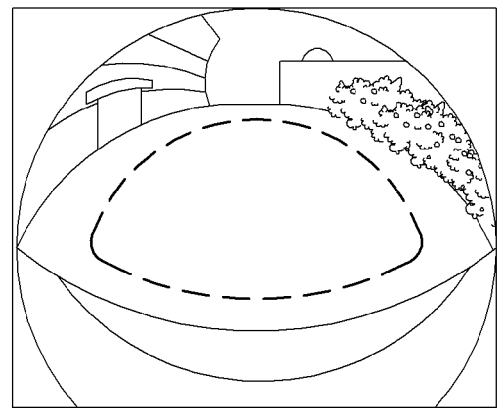

As illustrated in FIGS. 4A and 4B, a method of setting an area used to calculate a brightness histogram in each image uses two calculation methods.

After calculating the brightness histogram using one of the two calculation methods, a shape of a histogram is simplified by lowering the quantization level to be less than 256 level (8 bits) that is a general brightness level, as illustrated in FIG. 5.

Quantization is to perform division into a finite number of levels at which a change amount of continuous analogs discretely varies within the range of a constant width, and to assign a unique value to each level.

Accordingly, when the quantization level is lowered, the shape of the histogram is simplified.

Next, in operation S230 of calculating a representative value of at least one modal in the brightness histogram, and grouping a modal of each correction area based on the representative value, the representative value of each modal may be calculated as any one of an average brightness value and a maximum value of pixels of each modal.

Here, the modal refers to a parabolic shape including at least one peak between two bottoms, as illustrated in FIG. 6.

Accordingly, it can be said that two modals are present in the graph of FIG. 6.

The representative value of each modal may be calculated as the average brightness value of pixels belonging to each modal by referring to the shape of the histogram in which the quantization is lowered in the brightness histogram calculating operation.

The average brightness value of pixels is calculated by multiplying each x-axial value of each modal by a y-axial value corresponding to each x-axial value, adding up the multiplication result, and dividing the addition result by all the y-axial values corresponding to x-axial values.

Also, the representative value of each modal may be calculated as a peak value of each modal.

As illustrated in FIG. 7, a clustering method is used as a method for grouping a modal.

The clustering method may be a kind of classification work of including, in the same cluster, objects present in the same distance on a vector space and including, in different clusters, objects not present in the same distance, based on statistical similarity between objects that constitute a data set called a cluster analysis.

In graphs after being grouped into group 1 and group 2 by the clustering method, $V\_11, V\_21$, and the like, are used to help the easy understanding in the brightness corrected value calculating operation, and indicate representative values of the respective modals.

Next, in operation S240 of calculating a correction target value of each group based on a representative value of modals grouped into each group, the correction target value may be calculated as any one of an average value of representative values of modals grouped into each group, a representative value of a modal having a widest area, and a representative value of a modal having a highest peak value.

In a method of using the average value of representative values of modals grouped into each group, a correction target value of group 1 may be calculated as $(V\_21+V\_31+V\_41)/3$, and a correction target value of group 2 may be calculated as $(V\_11+V\_22+V\_32)/3$.

An area when calculating the representative value of the modal having the widest area is calculated by adding up all the y-axial values corresponding to x-axial values of the modal.

Next, in operation S250 of calculating a corrected value by subtracting the representative value of the modal of each group of each correction area from the correction target value of each group, the corrected value corresponding to each modal is calculated as a value obtained by subtracting the representative value of each modal from a correction target value of a group to which each modal belongs.

Next, in operation S260 of correcting brightness by adding the corrected value to a pixel value of each group of each correction area, and creating at least two corrected images, the brightness may be corrected by adding each corresponding corrected value to the pixel value of each group.

Each corresponding corrected value may be calculated based on a pixel value of each input image by multiplying the calculated corrected value of each modal by a weight of the pixel value of each input image.

The pixel value indicates a brightness value of a pixel using a number between "0" (black) and "255" (white).

When adding each corresponding corrected value to pre-correction pixel value based on a pixel value of each input image, a post-correction pixel value may be obtained.

Next, in operation S270 of composing the at least two corrected images into a single composite image, the plurality of input images may be composed into a single composite image.

A wide angle camera is used to photograph the surroundings of the vehicle to represent all around view of the vehicle on a single screen. Since a distortion phenomenon that an edge portion of an image is distorted due to a distortion of a camera lens having a short focal distance occurs, a correction and flatness is basically performed on the distortion after the plurality of images is composed into the single composite image.

Compared to the related art, brightness of an image may be naturally corrected using the aforementioned method and thus, a driving environment of a user may be improved.

Although a method for brightness equalization of a plurality of images of the present invention is described with reference to a few exemplary embodiments of the present invention, the scope of the present invention is not limited thereto and thus, it will be apparent to those skilled in the art that corrections, modifications, and various modified embodiments may be made without departing from the spirit of the present invention.

What is claimed is:

1. A method for brightness equalization of a plurality of images, the method comprising:
    receiving at least two input images;
    composing the at least two input images into a single composite image;
    setting a correction area corresponding to each input image in the composite image, and calculating a brightness histogram of each correction area;
    calculating a representative value of at least one modal in the brightness histogram, and grouping a modal of each correction area based on the representative value;
    calculating a correction target value of each group based on a representative value of modals grouped into each group;
    calculating a corrected value by subtracting the representative value of modals of each group of each correction area from the correction target value of each group; and
    correcting brightness by adding the corrected value to a pixel value of each group of each correction area.

2. The method of claim 1, wherein, in the composing, a correction and flatness is performed on distortion.

3. The method of claim 1, wherein the brightness histogram is calculated in the entire area corresponding to each input image in the composite image or calculated in an area in which the input images are adjacent to each other in the composite image.

4. The method of claim 3, wherein a quantization level is lowered to simplify a shape of the brightness histogram.

5. The method of claim 1, wherein the modal is a curve in a parabolic shape including at least one peak value between at least two bottom values.

6. The method of claim 1, wherein the representative value of each modal is calculated as any one of an average brightness value and a maximum value of pixels of each modal.

7. The method of claim 6, wherein the average brightness value of pixels of each modal is a value obtained by multiplying each x-axial value of each modal by a y-axial value corresponding to each x-axial value, adding up the multiplication result, and dividing the addition result by all the y-axial values corresponding to x-axial values.

8. The method of claim 1, wherein the correction target value is calculated as any one of an average value of representative values of modals grouped into each group, a representative value of a modal having a widest area, and a representative value of a modal having a highest peak value.

9. A method for brightness equalization of a plurality of images, the method comprising:
    receiving at least two input images;
    setting a correction area in each input image, and calculating a brightness histogram of each correction area;
    calculating a representative value of at least one modal in the brightness histogram, and grouping a modal of each correction area based on the representative value;
    calculating a correction target value of each group based on a representative value of modals grouped into each group;
    calculating a corrected value by subtracting the representative value of modals of each group of each correction area from the correction target value of each group;
    correcting brightness by adding the corrected value to a pixel value of each group of each correction area, and creating at least two corrected images; and
    composing the at least two corrected images into a single composite image.

10. The method of claim 9, wherein the brightness histogram is calculated in the entire area of each input image or calculated in an area to be used for composition in each input image.

11. The method of claim 10, wherein a quantization level is lowered to simplify a shape of the brightness histogram.

12. The method of claim 9, wherein the modal is a curve in a parabolic shape including at least one peak value between at least two bottom values.

13. The method of claim 9, wherein the representative value of each modal is calculated as any one of an average brightness value and a maximum value of pixels of each modal.

14. The method of claim 13, wherein the average brightness value of pixels of each modal is a value obtained by multiplying each x-axial value of each modal by a y-axial value corresponding to each x-axial value, adding up the multiplication result, and dividing the addition result by all the y-axial values corresponding to x-axial values.

15. The method of claim 9, wherein the correction target value is calculated as any one of an average value of representative values of modals grouped into each group, a representative value of a modal having a widest area, and a representative value of a modal having a highest peak value.

16. The method of claim 9, wherein, in the composing, a correction and flatness is performed on distortion.

* * * * *